United States Patent [19]

Gelardi et al.

[11] Patent Number: 4,606,513

[45] Date of Patent: Aug. 19, 1986

[54] TAPE CASSETTE PRESSURE FLAP ASSEMBLY

[75] Inventors: Anthony L. Gelardi; Paul J. Gelardi, both of Cape Porpoise; Robert B. MacLeod, Jr., Kennebunkport, all of Me.

[73] Assignee: Shape Inc., Biddeford, Me.

[21] Appl. No.: 789,845

[22] Filed: Oct. 21, 1985

Related U.S. Application Data

[60] Division of Ser. No. 615,875, May 31, 1984, Pat. No. 4,569,492, which is a continuation-in-part of Ser. No. 417,658, Sep. 13, 1982, abandoned.

[51] Int. Cl.⁴ .............................................. G11B 15/32
[52] U.S. Cl. ..................................... 242/199; 29/434; 264/130; 264/155; 264/156; 264/160; 264/328.1
[58] Field of Search ................ 242/192, 194, 197–200, 242/76, 55.19 A; 226/195–199; 360/93, 96.1, 132; 267/41, 49, 158–164; 200/283; 29/434; 264/130, 155, 156, 160, 328.1

[56] References Cited

U.S. PATENT DOCUMENTS

| | | |
|---|---|---|
| 3,211,874 | 10/1964 | Bengtsson ............................ 200/166 |
| 3,764,177 | 10/1973 | Woodward ............................. 296/43 |
| 3,797,779 | 3/1974 | Esashi et al. ........................ 242/199 |
| 4,032,739 | 6/1977 | Nicolaisen et al. .................. 200/283 |
| 4,290,567 | 9/1981 | Saito .................................... 242/198 |
| 4,304,374 | 12/1981 | Okamura et al. .................... 242/199 |
| 4,405,097 | 9/1983 | Gebeke ................................. 242/199 |

FOREIGN PATENT DOCUMENTS

| | | |
|---|---|---|
| 0086625 | 8/1983 | European Pat. Off. . |
| 2930446 | 2/1980 | Fed. Rep. of Germany . |
| 3142831 | 6/1982 | Fed. Rep. of Germany . |
| 3149441 | 7/1982 | Fed. Rep. of Germany . |
| 1365131 | of 1914 | United Kingdom . |
| 1384827 | 2/1975 | United Kingdom . |
| 2001296 | 1/1979 | United Kingdom . |
| 2027676 | 2/1980 | United Kingdom . |
| 2057395 | 4/1981 | United Kingdom . |
| 2072141 | 9/1981 | United Kingdom . |
| 2077227 | 12/1981 | United Kingdom . |
| 2101083 | 1/1983 | United Kingdom . |

OTHER PUBLICATIONS

Patent Abstracts of Japan, vol. 5, No. 17, 1/31/81 (p–47) (689), 55-146665.

Primary Examiner—John M. Jillions
Attorney, Agent, or Firm—Staas & Halsey

[57] ABSTRACT

A tape cassette pressure flap and pressure flap/cassette housing assembly and related methods for manufacturing the pressure flap and for assembling the pressure flap in the cassette housing. The pressure flap is substantially flat and made of a flexible material. The flap has a first free end with a low coefficient of friction for normally urging a tape portion into contact with a support member of the cassette housing so as to minimize slackness of the tape, and a second end for being fixedly attached to the cassette housing. A piece is formed at the fixed end to form a flange. The fixed end is then inserted between a pair of walls and the support member formed in the cassette housing. The inserted fixed end of the pressure flap terminates at an area formed by the second wall positioned substantially at an angle to the first wall, so that the pressure flap cannot be pushed out of position relative to the tape upon which it resiliently abuts. The angled flange cut in the fixed end of the pressure flap abuts a columnar supporting member. This pressure flap and pressure flap/cassette housing assembly eliminates slackness and the disadvantages of the prior art adhesive-type and non-adhesive-type pressure flaps. Moreover, it provides a more efficient manufacturing process using a relatively simple stamping, bending and inserting procedure and increased efficiency during automated insertion of the pressure flap into the cassette housing.

19 Claims, 7 Drawing Figures

TAPE CASSETTE PRESSURE FLAP ASSEMBLY

BACKGROUND OF THE INVENTION

This application is a Divisional of U.S. Ser. No. 615,875 filed May 31, 1984, now U.S. Pat. No. 4,569,492, which is a Continuation-In-Part of U.S. Ser. No. 417,658 filed Sept. 13, 1982 now abandoned.

1. Field of the Invention

This invention relates to a tape cassette, and more particularly, to a pressure flap held in a cassette housing for resiliently contacting the running tape and minimizing slackening thereof.

2. Description of the Prior Art

When a tape cassette is being handled, or is otherwise disengaged from the recording and/or reproducing apparatus with which it is intended to be used, one or both of the freely rotatable tape reels within the cassette housing may turn and slacken the tape, particularly across the opening of the cassette housing.

It is essential for the proper operation of tape cassettes that excessive looseness or slackness in the running tape be avoided, because if the run of the tape is excessively loose or slack, the tape may be improperly engaged by the magnetic head, or may be improperly wound internally of the cassette. In either case, damage to the tape may occur, or defective sound recording and/or reproducing operations may result.

To compensate for the looseness or slackness, pressure flap assemblies are used to maintain a resilient pressure upon the running tape. Pressure flaps are basically resilient, flexible elements, made preferably of plastic, fixed at one end to the cassette housing and have their other end a free end which resiliently abuts the running tape.

Of course, with the manufacture of pressure flap assemblies, as with the manufacture of most items, the major considerations are cost-efficient production of the flap and expeditious, automated assembly of the flap into the cassette housing. Thus, the pressure flap having a design requiring the fewest manufacturing steps, in both production and assembly, and yet efficiently eliminating tape slackness, is preferred.

Traditionally, one end of a tape cassette pressure flap was fixedly mounted in the cassette housing by cement or some other type of adhesive. An example of this type of pressure flap assembly has been proposed in U.S. Pat. No. 3,797,779. However, adhesive pressure flaps are unreliable over time primarily because of the following reasons: the adhesive force deteriorates due to binding problems or aging, and the flap eventually peels-off from the cassette housing; the pressure used to fasten the end portions is usually not consistent from one application to the next; leakage of adhesive from the sides of the end portions to the inside of the cassette causes contamination of the magnetic tape; and the necessarily exact positioning required for the end portions is difficult to achieve and, thus adhesive pressure flaps do not lend themselves to efficient, automated, machine assembly.

Means were then developed to assemble the pressure flap in the cassette housing without the use of the unreliable adhesives. For example, U.S. Pat. No. 4,290,567 proposes pressure flaps slidably inserted into special holders in the cassette housing. Various embodiments of pressure flaps are disclosed in this patent wherein, either recesses are formed in the fixed ends of the pressure flap for receiving corresponding projections formed in the holders, or the pressure flaps have projections formed thereon for projecting into corresponding recesses formed in the holders. The pressure flap could not be pulled out because of the recess and projection structure. However, the need to manufacture the special recesses and projections in both the pressure flap and the holder demand a relatively expensive manufacturing procedure, and properly aligning the projections with the recesses necessarily complicates automated assembly.

More recently, it has further been proposed in U.S Pat. No. 4,304,374, to provide a non-adhesive type pressure flap having a "hollow" fitting portion to entirely surround a cylindrical supporting member. A cassette housing projection is further placed between the supporting member and the free end of the pressure flap to abut the mid-section of the flap and to prevent rotation of the flap about the supporting member. The "hollow" can take the cross-sectional shape of either a rectangle or a cylinder.

Although this "hollow" fitting design for a pressure flap eliminates some of the problems inherent in both the earlier typical adhesive flap and the projection/recess design, the rather elaborate stamping, spreading and insertion required to produce and assemble the "hollow" fitting pressure flap assembly disclosed in U.S. Pat. No. 4,304,374 still does not teach a pressure flap assembly capable of the most cost-efficient production nor the most time-efficient automated assembly.

SUMMARY OF THE INVENTION

Accordingly, it is an object of this invention to provide a tape cassette pressure flap to minimize slackness in the run of the tape when the cassette is removed from the magnetic recording and/or reproducing apparatus with which it is intended to be used.

It is another object of this invention to overcome the disadvantages characteristic of the conventional adhesive-type pressure flap by providing a pressure flap which can be reliably and efficiently inserted into the cassette housing without the possibility of peeling off after assembly.

It is another object of the present invention to provide a pressure flap which is relatively quick and inexpensive to make, and yet efficiently eliminates tape slackness.

It is another object of this invention to provide a relatively simple pressure flap and cassette housing, which taken together combine to securely position the pressure flap.

It is another object of the present invention to provide a method for inserting a pressure flap into a cassette housing using a relatively simple stamping, bending and inserting step, which at the same time cuts a flange from the pressure flap, bends it at an appropriate angle, and inserts it into the housing, thus increasing the speed and minimizing the cost of the tape cassette production process.

It is another object of the present invention to provide a pressure flap which is made quickly and inexpensively by injection molding and which efficiently eliminates tape slackness.

It is another object of the present invention to provide a pressure flap which is injection molded of a single material to eliminate a need for a separate low-friction tape contacting surface added to the free end of the flap, thus minimizing production costs and manufacturing time.

Finally, it is an object of the present invention to provide a one-step method for automatically inserting an injection-molded pressure flap into a cassette housing, thus increasing the speed and minimizing the cost of the tape cassette production process.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

To achieve the foregoing and other objects of the invention and in accordance with the purpose of the invention there are provided several embodiments of a pressure flap, a cassette housing assembly for receiving the pressure flap, several methods of manufacturing the pressure flap and of assembling the pressure flap into the cassette housing.

In a preferred embodiment there is provided a substantially flexible pressure flap having a first and a second end, the first end having a tape contacting surface and the second end having a substantially rectangular, angled flange. There is also provided an area in a cassette housing formed by a cylindrical supporting member, and adjacent first and second walls formed at an angle to each other for receiving the pressure flap.

This pressure flap is made by forming a roll of flexible material and covering one edge of the roll with a coating having a relatively low coefficient of friction relative to the tape, cutting and removing various areas in the roll, bending the flange at an angle relative to the plane of the roll, and cutting the roll at equally spaced intervals to separate the roll into individual pressure flaps.

A method of assembly is also taught wherein the pressure flap is inserted into the area formed in the cassette housing. The flange is bent greater than thirty degrees and is inserted along the supporting member such that the second end of the pressure flap is securely engaged by the area formed in the cassette housing. By this insertion, the flange in the fixed end rests aside of the cylindrical supporting member.

In an alternate embodiment of the pressure flap there is provided a generally flat, flexible pressure flap having a first end and a second end, the first end being the free tape contacting end and the second end having two substantially parallel, rectangular flanges which are substantially perpendicular to the plane of the pressure flap. There is also provided in a cassette housing an area defined by a cylindrical support member and an adjacent wall for receiving the second end of the pressure flap.

This alternate embodiment pressure flap is made by an injection molding process using a single material of suitable lubricity and flexibility to contact the running tape with minimal friction while allowing sufficient pressure to eliminate tape slackness.

An alternate method of assembly is also taught wherein the injection molded pressure flap is inserted into the flap receiving area of the cassette housing. The flap is inserted such that the two flanges lie laterally of the support member between the support member and a wall of the cassette housing. By this method the second end of the pressure flap is effectively secured in the area formed in the cassette housing.

These pressure flaps eliminate the disadvantages of the prior art adhesive-type pressure flaps, such as dislocation through eventual loss of adhesiveness, and improves upon non-adhesive-type pressure flaps by effecting more simplified and cost-efficient production of pressure flaps and more efficient, automated assembly of the pressure flap into the cassette housing.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
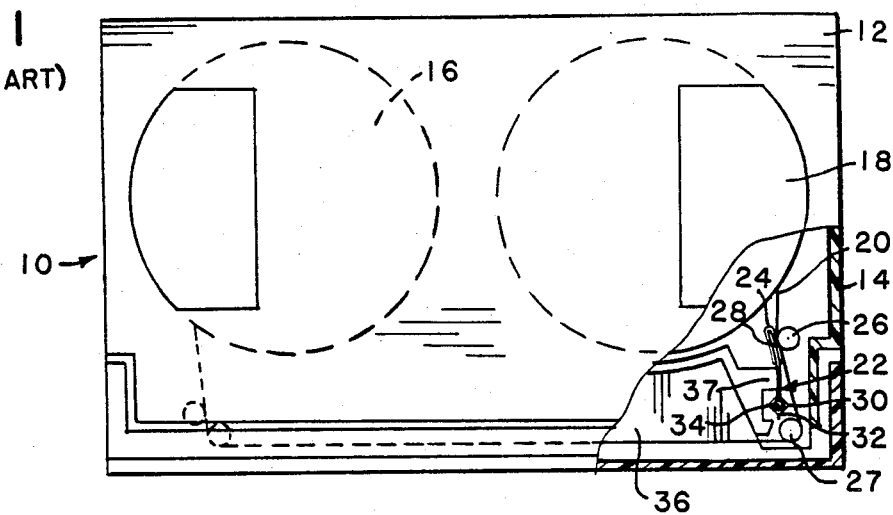
FIG. 1 is a partial sectional, top view of a prior art video tape cassette, illustrating particularly a prior art non-adhesive-type pressure flap assembled within the cassette.

As shown in FIG. 1, a conventional video tape cassette housing 10 has a flat, substantially rectangular configuration which may be formed of a suitable plastic and consists of an upper half case 12 and a lower half case 14. Tape reels 16 and 18 are suitably located within cassette housing 10 so as to be freely rotatable in side-by-side relation and a magnetic tape 20 is wound on reels 16 and 18 in operation. A pressure flap 22 is placed at the path of the magnetic tape 20 at an area between the reels 16 and 18. The magnetic tape 20 is pushed by the pressure flap 22 between a tape contacting surface 24 of the pressure flap 22 and a first guide pole 26 so as to maintain the stability of the magnetic tape 20 as it runs through the cassette housing 10. A second guide pole 27, such as a round rod with a sleeve, is mounted on the inner surface of the lower half case 14 and is utilized to guide the magnetic tape 20 around the corner of the housing 10 and to increase its tautness.

The prior art pressure flap 22 shown in FIG. 1, more particularly, has a first free end 28 and a fitting hollow 30 formed at the second fixed end 32, which may be square or circular in cross-section. The fitting hollow 30 fits over and entirely surrounds a columnar supporting member 34 which is connected to a bed 36 formed in the cassette housing 10 at the inner side of the lower half case 14. A projection 37 is also formed on the bed 36 and is used to prevent the turning or rotation of the pressure flap 22 around the supporting member 34.

Figure 2:
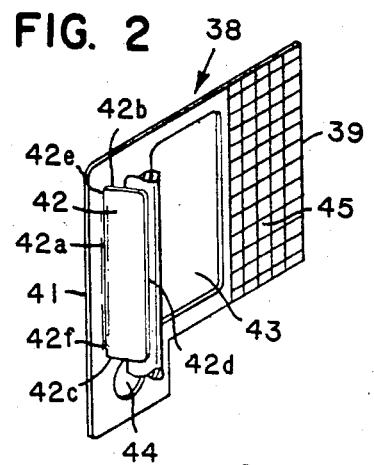
FIG. 2 is a perspective view of the pressure flap of the present invention, illustrating in particular the angled flange resting aside of the supporting member of the cassette housing.

The preferred embodiments of the present invention will now be discussed. FIG. 2 illustrates particularly the structure of the preferred embodiment of the pressure flap according to the present invention.

As shown in FIG. 2, a pressure flap 38 of the present invention for use in contacting magnetic tape running in a tape cassette, comprises a first end 39 in free engagement with tape in the cassette housing, and a second end 41 with a single flange 42 formed at and projecting from the second end 41 for securing the pressure flap 38 in the cassette housing. The flange 42 is preferably angled in relation to the body of the pressure flap, as will be discussed more fully hereafter. Preferably, the pressure flap 38 is formed of a suitably resilient material such as polyester resin, polyethyleneterephthalate, or a spring metal which is relatively flexible.

More particularly, the pressure flap 38 is a substantially flat and rectangular member. Located centrally of the pressure flap there is a square-shaped opening or void 43 which is necessary because it allows a beam of light to be shown from one end of the cassette through the other when the cassette is inserted into the cassette player/recorder, as is known in the art. At one end of the pressure flap there is located the flange 42. The flange 42 has a generally rectangular shape, but other shapes of the flange 42, e.g., a semicircular or triangular shape will suffice, as long as it is capable of being supported by the support member of the cassette housing, which support member will be explained more fully later.

Regarding the rectangular-shaped flange 42 of the preferred embodiment, one side 42a of the rectangle is made to be integral of the resilient pressure flap material, and the three other sides 42b, 42c and 42d are free. To avoid the possibility of the flange tearing due to the sharp corners between sides 42b and 42a and 42c and 42a, there may be located at the corners of the rectangular flange where the integral side meets two of the three other sides, small, confronting circular voids. There may alternatively be provided slits 42e and 42f located in the side 42a formed integrally of the pressure flap at the corners of the rectangular flange where the integral side 42a meets the two sides 42b and 42c for ensuring bending of the flange, as will be described later.

Located below the rectangular flange 42 is a circular hole or void 44, which is used during the method of manufacture and assembly of these pressure flaps for purposes of indexing, as will be described later.

The free end portion 39 of the pressure flap 38 has a double-sided tape contacting surface 45 with a relatively low coefficient of friction in respect to the magnetic tape with which it is to engage. The tape contacting surface 45 is disposed along the two outer side surfaces of the free end 39 of the pressure flap 38, and is made of, for example, a coating or layer of polytetrafluoroethylene, or generally materials containing carbon or graphite thereon. However, the low friction material is preferably graphite lubricated, meshed Teflon. The low coefficient of friction material is suitably attached to or pressed onto the free end 39 using an adhesive, cement, heat or mechanically activated bonding technique, or the like.

The low friction tape contacting surface 45 on such free end portion 39 ensures that the tape will be protected from excessive wear or other damage which might be caused by the continuous contact of the tape with the pressure flap 38. The tape contacting surface 45 on the pressure flap 38 further serves to reduce the static electricity that is induced on the magnetic tape as a result of the movement of the latter in contact with the pressure flap 38.

Thus, in accordance with the principles of this invention there is provided a pressure flap having a relatively simple and economical design, but which is capable of efficiently eliminating tape slackness.

Figure 3:
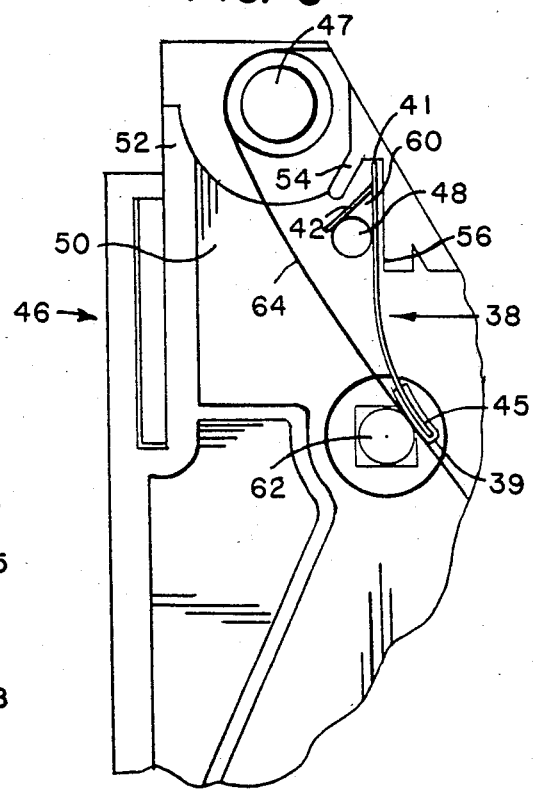
FIG. 3 is a partially enlarged sectional view of the pressure flap assembly of the present invention, illustrating in particular the relationship of the two walls to the supporting member formed in the cassette housing and the insertion of the flange between one of the walls and the supporting member.

FIG. 3 illustrates particularly the preferred embodiment of the pressure flap 38 described above in combination with a tape cassette housing 46 in accordance with the present invention. Cassette housing 46 comprises a corner tape guide 47 and a supporting member 48 mounted to a bed 50 located at the inner side of the lower half case 52 of the cassette housing 46. The supporting member 48 also is columnar and is made of a rigid plastic. The supporting member 48 has a width approximately equal to the width of the rectangular flange 42 of the pressure flap described above and a height slightly greater than the length of flange 42.

In addition, the cassette housing 46 further comprises a first wall 54 and a second wall 56 having the configurations shown in FIG. 3. Each of these walls are flat and extend upwardly from the bed 50 of the cassette housing 46. The first wall 54 is located near the corner tape guide 47. The first wall 54 is also located near the second wall 56 and the supporting member 48 such that the first wall 54 and the second wall 56 are positioned substantially at an angle to each other, and the supporting member 48 is located in the angle formed thereby. The first wall 54, like the supporting member 48, is about as wide as or slightly less than the width of the flange 42. The second wall 56 is located adjacent to the supporting member 48 and starts in the vicinity of the first wall 54, extends in the direction of a guide 62, and terminates in the vicinity of the supporting member 48. Together, the first wall 54, the second wall 56 and the supporting member 48 combine to form an area 60 for receiving the second end 41 of the pressure flap 38.

When the pressure flap 38 is to be inserted, the flange 42 is bent at an angle of greater than 45 degrees so that the flange 42 easily fits between the supporting member 48 and the first wall 54. Once inserted, the inherent resiliency of the material from which the pressure flap 38 is formed causes the flange 42 to move towards the body of the pressure flap 38 until it abuts the supporting member 48. When the flange 42 rests against the supporting member 48, the angle subtended between the flange 42 and the plane of the fixed end 41 of the pressure flap is then about 45 degrees.

In addition, the tape 64 is resiliently passed by the free end 39 of the pressure flap 38 against a guide 62 which is also mounted to the bed 50. As stated, the tape contacting surface 45 of the pressure flap 38 minimizes friction at the contacting surface with the tape 64.

Thus, it can be seen that a new tape cassette pressure flap assembly is disclosed wherein the pressure flap 38 is securely positioned within the cassette housing 46. This assembly includes the second fixed end 41 of the pressure flap 38 of the present invention being inserted into the area 60 with the angled flange 42 resting aside of the columnar supporting member 48. The pressure flap is resiliently supported along columnar supporting member 48 while being prevented from moving in a direction away from the tape 64 by the area 60 formed by the merged walls 54 and 56, and the supporting member 48.

FIG. 3 also illustrates the method for assembling the preferred embodiment of the pressure flap into the cassette housing according to the present invention. As can be seen from FIG. 3, the flange 42 of the pressure flap 38 is bent at greater than a 45 degree angle by a stamping, bending and insertion procedure to be more fully explained later. The pressure flap 38 with angled flange 42 is then manually, or preferably automatically, machine-inserted such that the second, fixed end 41 is positioned in the area 60, i.e., the area between the first wall 54, the second wall 56 and the supporting member 48. The angled flange 42 particularly, is positioned along the columnar supporting member 48 between the columnar supporting member 48 and the first wall 54.

As stated, in the tape cassette pressure flap assembly of the present invention, assembly of the pressure flap 38 is necessarily accomplished by insertion of the angled flange 42 along the supporting member 48 in the area between the supporting member 48 and the first wall 54. Dependable assembly becomes remarkably high and can be carried out by an automatic assembling machine. However, the configuration of this pressure flap and the cassette housing also allows for quick and easy manual insertion of the flap into the housing when circumstances require same. The pressure flap then is held in its specific position and will not slip or "peel off." When the fixed end 41 of the pressure flap 38 is inserted into the area 60, the free end 39 is positioned resiliently against the tape 64 and the guide 62. The second wall 56 promotes this resiliency by urging the pressure flap 38.

Thus, in accordance with the preferred embodiment of the present invention, the development of looseness or slackness in the tape run by reason of the necessarily free rotation of tape reels when the cassette housing 46 is apart from the magnetic recording and/or reproducing apparatus, is avoided by providing the cassette housing 46 employing first wall 54, second wall 56, supporting member 48 and flange 42 to resiliently hold flexible pressure flap 38 to member 62.

Figure 4:
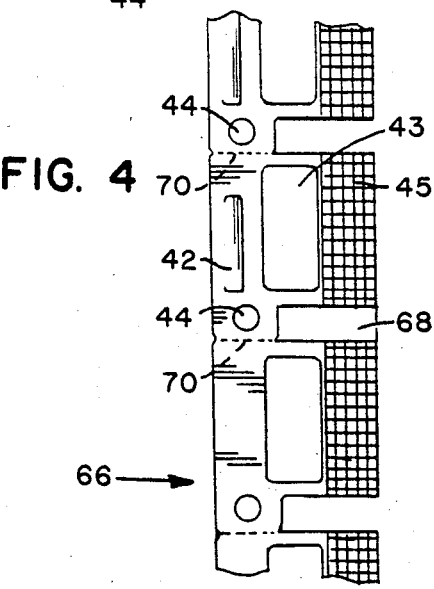
FIG. 4 is a front view of a continuous flexible roll from which one embodiment of the pressure flap of the present invention is in the process of being formed.

FIG. 4 illustrates one method of manufacturing the preferred embodiment of the pressure flap according to the present invention. A roll of flexible material 66 is formed from, e.g., polyester. The tape contacting surface 45 is first applied to one side edge of the roll 66. The roll 66 is moved into a machine having a cutting/stamping and insertion station which simultaneously: (1) cuts the circular holes or voids 44 for subsequent indexing purposes; (2) cuts and removes the rectangular spaces 68, which are removed for the reason of keeping the flap from scraping along the cassette housing bed 50; (3) cuts and removes the rectangular-shaped pieces 43; (4) cuts and angles the flange portion 42 to an angle of greater than 45 degrees; (5) cuts and separates the individual pressure flaps 38 (as shown by the dotted line 70 in FIG. 4); and (6) assembles the pressure flap 38 into cassette housing 46 by inserting the fixed end 41 into the area 60 of the cassette housing, such that the flange 42 abuts the supporting member 48 at an angle of about 45 degrees.

Of course, these steps may be performed in a different sequence if preferred, or each of these steps may be performed individually at different work stations, although the preferred embodiment comprehends performing substantially all of the steps at the same time.

The angled flange, more particularly, is manufactured by stamping straight cuts in three sides of a rectangle and bending the cut-out portion along the fourth side of the rectangle. As previously stated, at the corners where the integral side of the rectangular flange meets two of the other three sides slits or small, confronting circular voids may also be cut.

Thus, the angled flange is formed in the pressure flap and is non-rotatably fitted along the supporting member mounted on the inner surface of the housing so as to support the pressure flap. Therefore, the operation efficiency for assembly of the pressure flap is remarkably improved, the pressure flap can be easily assembled by an automatic stamping and assembling machine, the slippage or the peeling of the pressure flap in the assembling operation or after the assembling operation can be completely prevented and the reliability of the pressure flap is remarkably improved.

Figure 5:
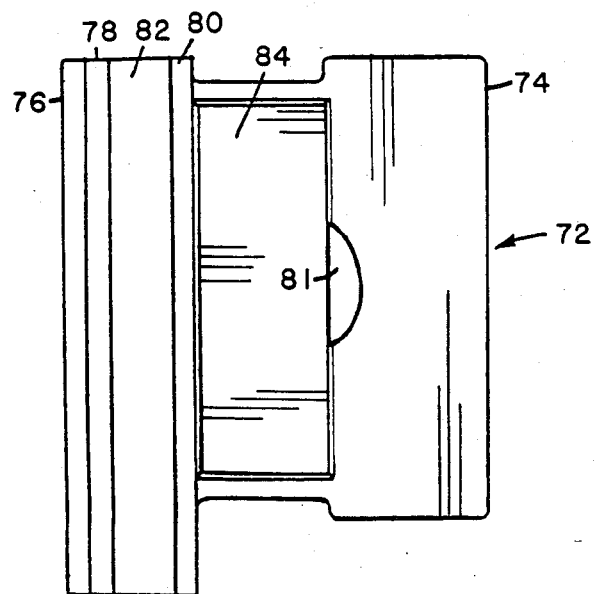
FIG. 5 is a plan view of an alternate embodiment of the pressure flap of the present invention, illustrating in particular the position of two parallel flanges used to abut the support member.
Figure 6:
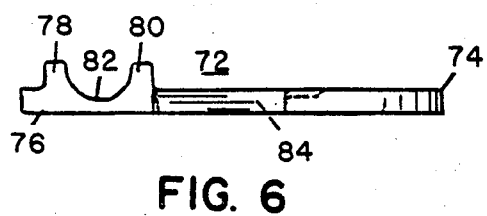
FIG. 6 is a side view of the alternate embodiment pressure flap shown in FIG. 5.
Figure 7:
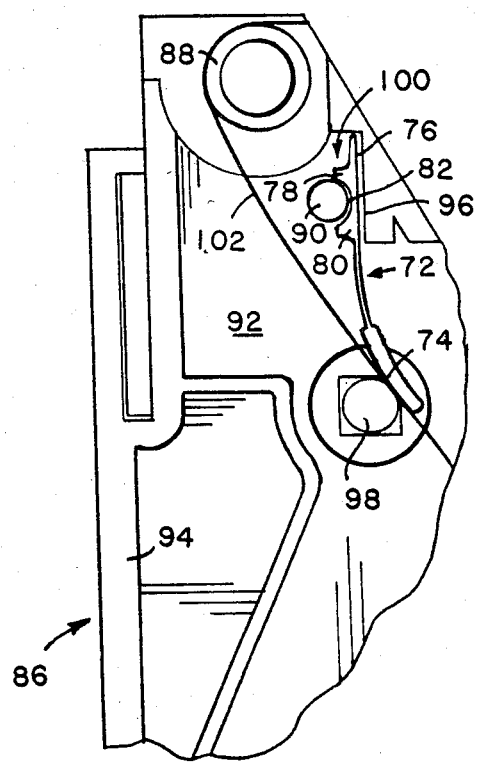
FIG. 7 is a partially enlarged sectional view of the alternate embodiment of the pressure flap assembly of the present invention, illustrating in particular the relationship of the housing support wall to the columnar support member, and the position taken by the two flanges against the support member.

Alternate embodiments of the present invention will now be discussed. FIGS. 5, 6 and 7 illustrate particularly the structure of an alternate embodiment of the pressure flap according to the present invention.

As shown in FIGS. 5, 6 and 7, an injection-molded pressure flap 72 of the present invention for use in contacting magnetic tape running in a tape cassette, comprises a first end 74 for free engagement with tape in the cassette housing, and a second end 76 with first and second flanges 78 and 80, respectively, formed at and projecting from the second end 76 for securing the pressure flap 72 in the cassette housing.

As best seen in FIG. 5, the injection molding process leaves a semicircular indentation 81 associated with knock-out pins, as is known in the art. Both the first and second flanges 78 and 80, respectively, are formed by injection molding and extend substantially parallel to each other while being substantially perpendicular to the plane of the pressure flap 71. Between flanges 78 and 80 a rounded cavity 82 is formed to receive the correspondingly rounded support member 90. Preferably, the pressure flap 72 is formed of a single suitably resilient material which has suitable lubricity to effect minimal friction with the running tape and has sufficient flexibility to be able to apply suitable pressure on the running tape to prevent slackness. Examples of such resilient materials include nylon or acetal.

More particular to the pressure flap's 72 structure, it is a generally flat and rectangular member. Located centrally of the pressure flap there is a square-shaped opening or void 84 which is necessary because it allows a beam of light to be shown from one end of the cassette through the other when the cassette is inserted into the cassette player/recorder, as was described previously. As also stated, at one end of the pressure flap there is located a first flange 78 and a second flange 80. Each flange 78 and 80 has a generally rectangular shape, but other shapes, e.g., a semicircular or triangular cross-section will suffice as long as it is capable of being supported by the support member of the cassette housing, which support member will be explained more fully later.

In contrast to the preferred embodiment described above, wherein it was indicated that a circular hole or void 44 was located below the rectangular flange 42 to be used during the die-cut method of manufacture and assembly of these pressure flaps for purposes of indexing, the injection molded pressure flap 72 of the alternate embodiment requires no such void 44.

In addition, the first free end portion 39 of the preferred embodiment pressure flap 38 required a separate, double-sided tape contacting surface 45 having a relatively low coefficient of friction in respect to the magnetic tape with which it is to engage. The low coefficient of friction material had to be suitably attached to or pressed onto the free end 39 using an adhesive, cement, heat or a mechanically activated bonding technique, or the like. In contrast, since the alternate embodiment of the pressure flap of the present invention is injection molded of a single material having sufficient lubricity to contact the running tape without damage, there is no need to apply a separate low-friction tape contacting member. Thus, the alternate embodiment minimizes manufacturing steps and production costs in relation to the preferred embodiment. Therefore, in accordance with the principles of this invention there is provided an alternate embodiment of a pressure flap having a relatively simple and economical design, but which is capable of efficiently eliminating tape slackness.

FIG. 7 illustrates particularly the alternate embodiment of the pressure flap 72 described above in combination with a tape cassette housing 86 in accordance with the present invention. The tape cassette housing 86 may be the same as that described in regard to the preferred embodiment. On the other hand, since this alternate embodiment of the pressure flap abuts both sides of the columnar support member, only an angled support wall may be used. Thus, as seen in FIG. 7 cassette housing 86 comprises a corner tape guide 88 and a support member 90 mounted to a bed 92 located at the inner side of the lower half case 94 of the cassette housing 86. The support member 90 also is columnar and is made of a rigid plastic.

In addition, the cassette housing 86 further comprises a support wall 96 as shown in FIG. 7. The wall 96 is flat and extends upwardly from the bed 92 of the cassette housing 86. The support wall 96 is located adjacent to the support member 90 and starts in the vicinity of the corner tape guide 88, extends in the direction of another tape guide 98, and terminates in the vicinity of the support member 90. Together, the support wall 96 and the support member 90 combine to form an area 100 for receiving the second end 76 of the pressure flap 72.

To insert the pressure flap 72, the second end 76 is positioned between the support member 90 and the support wall 96 such that the first and second flanges 78 and 80, respectively, flank the support member 90 with the cavity 82 receiving part of the support member 90. The first end 74 of the pressure flap 72 is simultaneously positioned against the tape 102 running along the guide 98. This one step insertion process can be done by automated machinery.

Thus, it can be seen that another new tape cassette pressure flap assembly is disclosed wherein the pressure flap 72 is securely positioned within the cassette housing 86. This assembly includes the second fixed end 76 of the pressure flap 72 of the alternate embodiment of the present invention being inserted into the area 100 with the first and second flanges 78 and 80, respectively, resting aside of the columnar support member 90. The pressure flap is resiliently supported along the columnar support member 90 while being prevented from moving in a direction away from the tape 102 by the area 100 formed by the support wall 96 and the support member 90.

FIG. 7 also illustrates the method for assembling the alternate embodiment of the pressure flap 72 into the cassette housing 86 according to the present invention, which was described above. As stated, in the alternate embodiment of the tape cassette pressure flap assembly of the present invention, assembly of the pressure flap 72 is accomplished by positioning the flanges 78 and 80 along the sides of support member 90 in the area between the support member 90 and the support wall 96. Dependable assembly becomes remarkably high and can be carried out by an automatic assembling machine. However, the configuration of this pressure flap and the cassette housing also allows for quick and easy manual insertion or removal of the flap when circumstances require same. The pressure flap then is held in its specific position and will not slip or "peel off." When the fixed end 76 of the pressure flap 72 is inserted into the area 100, the first free end 74 is positioned resiliently against the tape 102 and the guide 98. The support wall 96 promotes resiliency by bending the pressure flap 72.

Thus, in accordance with the present invention, the development of looseness or slackness in the tape run by reason of the necessarily free rotation of tape reels when the cassette housing is apart from the magnetic recording and/or reproducing apparatus, is avoided by providing the cassette housing 86 employing support wall 96, support member 90 and flanges 78 and 80 to hold flexible pressure flap 72 such that it may resiliently abut the tape 102 at guide 98.

The method of injection molding used to make the alternate embodiment pressure flap according to the present invention is known in the art. Of course, as stated above, the material used in the injection molding must have sufficient lubricity and flexibilty for the purposes set out herein. Most importantly, parallel flanges 78 and 80 must be formed in the pressure flap and then non-rotatably fitted along the support member mounted on the inner surface of the housing so as to support the pressure flap. Through this design, the operation efficiency for assembly of the pressure flap is remarkably improved, the pressure flap can be easily produced and assembled by an automatic injection molding and assembling machine, the slippage or the peeling of the pressure flap in the assembling operation or after the assembling operation can be completely prevented and the reliability of the pressure flap is remarkably improved.

The above-described pressure flap and tape cassette pressure flap assemblies have been shown to be of the types intended for use in video tape recorders. However, the invention can be similarly applied to tape cassettes for use in audio or other recording and/or reproducing apparatus.

The foregoing is considered as illustrative only of the principles of the invention. Further since numerous modifications and changes will readily occur to those skilled in the art, it is not desired to limit the invention to the exact construction and operation shown and described, and accordingly, all suitable modifications and equivalents may be resorted to, falling within the scope of the invention and the appended claims and their equivalents.

We claim:

1. A pressure flap for contacting magnetic tape running in a tape cassette, comprising;
   (a) a substantially flat pressure flap element made of a flexible material and having first and second ends and an opening formed between the first end and the second end, wherein at least the first end has a low coefficient of friction relative to said tape, and wherein the second end's height, which is perpendicular to the longitudinal axis of the pressure flap, is greater than the corresponding height of the first end; and (b) a flange formed between the second end and the opening of the pressure flap element extending therefrom in substantially one plane at an angle to the plane of the pressure flap element, the flange having a first portion integrally formed of the pressure flap element substantially perpendicular to the longitudinal axis of the pressure flap and a second portion being a free portion extending from the pressure flap element.

2. The pressure flap as recited in claim 1, wherein the flange is substantially rectangular in shape and wherein the first portion comprises one of the sides of the rectangular flange, and the second portion comprises the other three sides of the rectangular flange.

3. The pressure flap as recited in claim 2, wherein the angle formed between the plane of the flange and the plane of the pressure flap element is approximately 45 degrees.

4. A tape cassette pressure flap assembly for contacting magnetic tape as the magnetic tape passes from one tape reel to another across an opening in the housing of the tape cassette to avoid slackening of the tape which results from the free turning of at least one of the tape reels, the assembly comprising:

(a) a pressure flap including—

(i) a substantially flat pressure flap element made of a flexible material and having first and second ends and an opening formed between the first end and the second end, wherein at least the first end has a relatively low coefficient of friction relative to said tape, and wherein the second end's height, which is perpendicular to the longitudinal axis of the pressure flap, is greater than the corresponding height of the first end; and (ii) a flange formed between the second end and the opening of the pressure flap element and extending therefrom in substantially one plane at an angle to the plane of the pressure flap element, the flange having a first portion integrally formed of the pressure flap element substantially perpendicular to the longitudinal axis of the pressure flap and a second portion being a free portion extending from the pressure flap element; and (b) a cassette housing having support means for receiving the second end of the pressure flap and the flange, and a guide element for abutting the moving tape, wherein during assembly the first end of the pressure flap is resiliently pressed against the tape running along the guide element and the second end and the flange of the pressure flap are received by the support means.

5. The assembly as recited in claim 4, wherein the support means comprises: a columnar support element and first and second walls positioned at an angle to each other, which together form the area for receiving the second end and flange of the pressure flap, wherein the second end and flange of the pressure flap is received by an area formed by the combination of the first and second walls and the support element such that the second end of the pressure flap rests in the area and the flange resiliently abuts the columnar support element.

6. The assembly as recited in claim 5, wherein the angle formed between the plane of the flange and the plane of the pressure flap element is approximately 45 degrees.

7. A method for forming a tape cassette pressure flap for minimizing slackness in a running tape, comprising the steps of:

(a) selecting a material which is substantially flexible and resilient;

(b) forming the material into a substantially flat workpiece with a first end and a second end, forming an opening between the first end and the second end, forming the second end's height, which is perpendicular to the longitudinal axis of the flap, greater than the corresponding height of the first end; and (c) forming a flange between the second end and the opening of the workpiece at an angle relative to the plane of the workpiece, the flange having a first portion integrally formed of the pressure flap element substantially perpendicular to the longitudinal axis of the pressure flap and a second portion being a free portion extending from the pressure flap element.

8. The method as recited in claim 7, wherein the workpiece formed in step (b) is a roll of flexible material, and further comprising the steps of:

(d) covering the first end of the roll with a coating having a relatively low coefficient of friction relative to the tape;

(e) cutting and removing an area from below the flange for indexing;

(f) repeating the above steps (c) through (e) continuously along the roll; and (g) cutting the roll at equally spaced intervals to separate the roll into individual pressure flaps.

9. The method as recited in claim 8, wherein the flange formed by step (c) is substantially rectangular in shape and wherein one of the sides of the rectangular flange is formed integrally of the pressure flap element, and the other three sides of the rectangular flange are free sides extending from the plane of the flexible material.

10. The method as recited in claim 9, wherein the angle formed between the flange and the plane of the pressure flap is approximately 45 degrees.

11. The method as recited in claim 7, wherein steps (b) and (c) are performed simultaneously by injection molding.

12. The method of claim 11, further comprising the step of:

(d) forming a second flange by injection molding between the first flange and the opening of the pressure flap at an angle relative to the plane of the workpiece.

13. The method as recited in claim 12, wherein the second flange is formed substantially rectangular in shape and one of the sides of the rectangular flange is formed integrally of the pressure flap element, and the other three sides of the rectangular flange are free sides extending from the plane of the flexible material.

14. The method as recited in claim 13, wherein the first and second flanges are formed in parallel relationship.

15. The method as recited in claim 14, wherein the angle formed between the first flange and the plane of the workpiece, and the second flange and the plane of the workpiece, respectively, is approximately 90 degrees.

16. The method as recited in claim 15, wherein the flexible material selected in step (a) has a low coefficient of friction relative to the tape.

17. A method for assembling a pressure flap into a cassette housing wherein tape runs, comprising the steps of:
(a) forming a pressure flap having—
 (i) a substantially flat pressure flap element with first and second ends and an opening formed between the first end and the second end, and being made of a flexible material,
  wherein at least the first end has a relatively low coefficient of friction relative to said tape, and
  wherein the second end's height, which is perpendicular to the longitudinal axis of the pressure flap, is greater than the corresponding height of the first end, and
 (ii) a flange formed between the second end and the opening of the pressure flap element extending from the pressure flap element in substantially one plane at an angle to the plane of the pressure flap element, the flange having a first portion integrally formed in the pressure flap element substantially perpendicular to the longitudinal axis of the pressure flap and a second portion being a free portion extending from the pressure flap element;
(b) forming a cassette housing having a support means for receiving the second end and flange of the pressure flap, and a guide element for abutting the moving tape; and
(c) inserting the pressure flap into the cassette housing such that the second end and the flange of the pressure flap securely rest in the support means and the first end of the pressure flap presses the tape against the guide element.

18. The method as recited in claim 17, wherein the flange is substantially rectangular in shape and wherein the first portion comprises one of the sides of the rectangular flange integrally connected to the pressure flap element and the second portion comprises the other three sides of the rectangular flange.

19. The method as recited in claim 18, wherein the support means comprises: a support element and first and second walls positioned at an angle to each other, which together form an area for receiving the second end and flange of the pressure flap, wherein the second end of the pressure flap is received between the first and second walls and a surface of the flange abuts the support element.

* * * * *